UNITED STATES PATENT OFFICE.

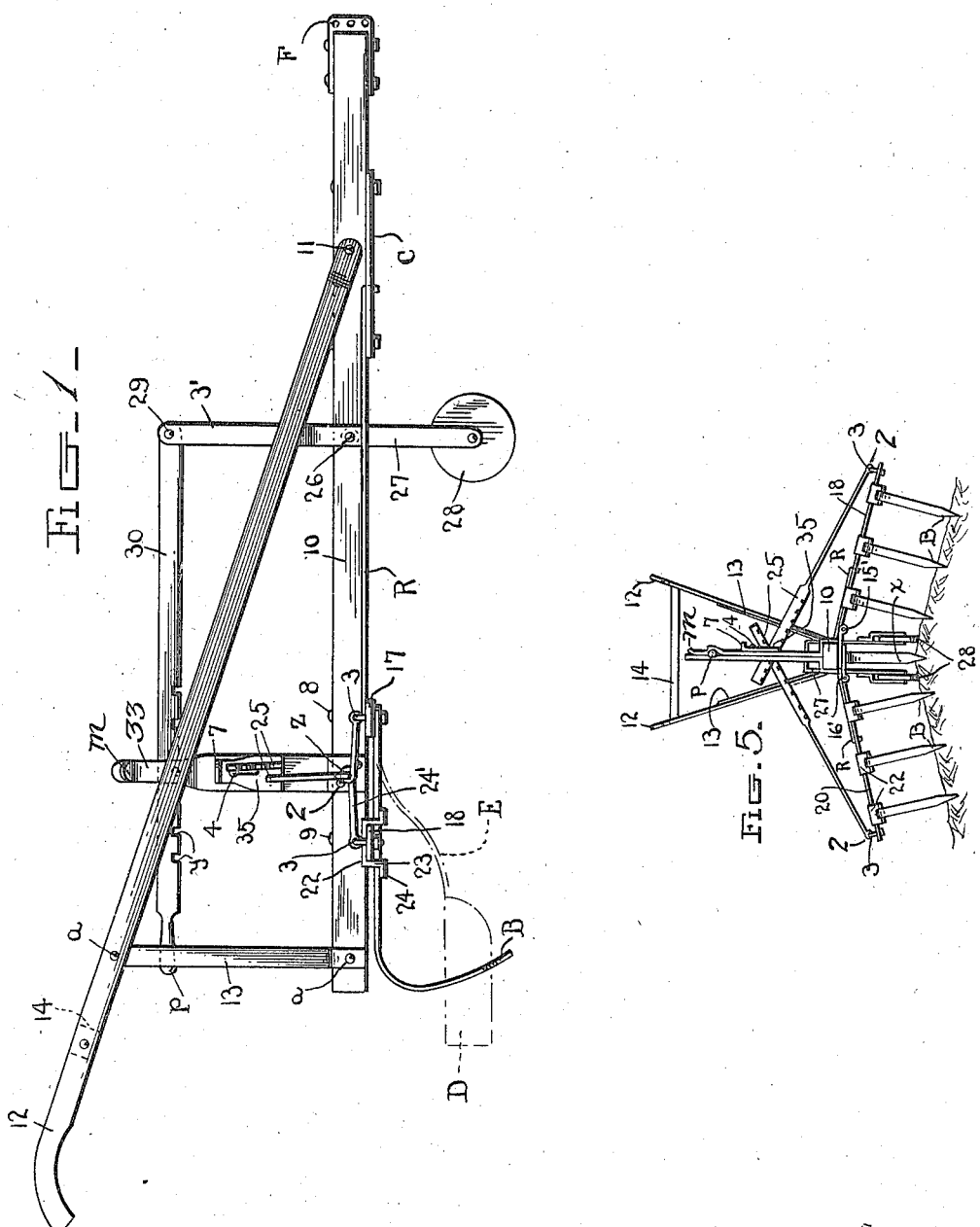

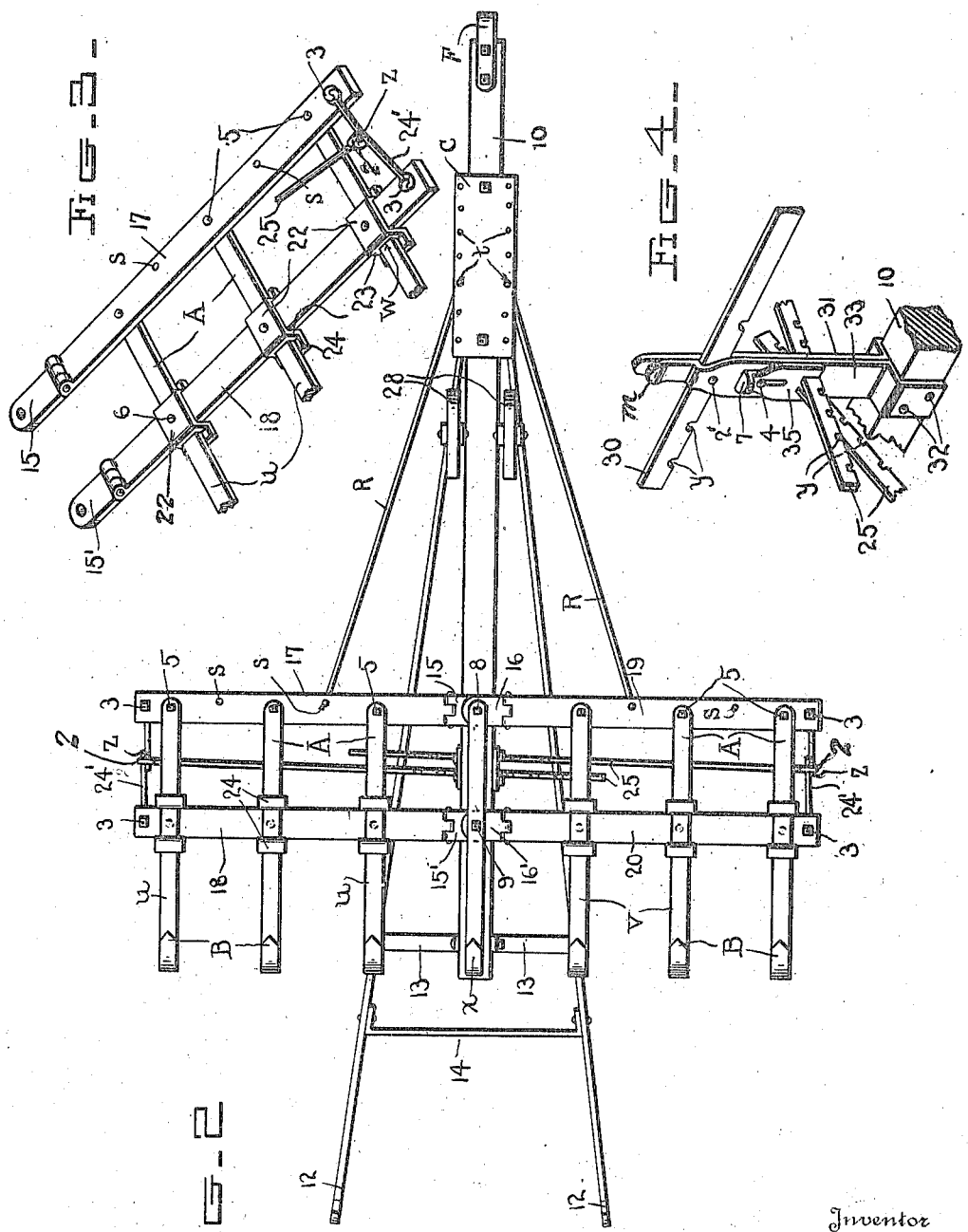

WRIGHT W. CAIN, OF KOSCIUSKO, MISSISSIPPI.

ADJUSTABLE CULTIVATOR.

1,233,550.   Specification of Letters Patent.   Patented July 17, 1917.

Application filed May 2, 1914. Serial No. 835,909.

*To all whom it may concern:*

Be it known that I, WRIGHT W. CAIN, a citizen of the United States, and a resident of Kosciusko, in the county of Attala and State of Mississippi, have invented certain new and useful Improvements in Adjustable Cultivators, of which the following is a specification, reference being had to the accompanying drawing.

My invention has for its object to improve the construction and operation of walking cultivators to the end that a cultivator may be provided having oppositely extending cultivator carrying frames which can be adjusted backward and forward as well as up and down.

Another object is to provide a cultivator including oppositely positioned pivotally held cultivator carrying frames which can be so set as to convert the cultivator into a harrow. A still further object is to provide a cultivator with a simply constructed means to regulate the depth the cultivator teeth enter the soil.

With these and other objects in view, the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which numerals of reference indicate similar parts in the several views:

Figure 1 shows a side elevational view of a cultivator embodying my invention.

Fig. 2, is a bottom view of Fig. 1.

Fig. 3, is a perspective detail of one of the cultivator carrying frames detached with parts of the cultivator teeth broken away.

Fig. 4, shows an enlarged perspective detail of the supporting standard showing broken portions of the notched supporting bars in position.

Fig. 5, shows a rear end view disclosing the cultivator carrying frames adjusted in a downwardly extending position.

In my present invention I provide a simply constructed readily adjustable implement for breaking up the surface of the ground and in carrying out the aim of my invention I construct a cultivator including a main carrying beam 10, which at its forward end is provided with a suitable clevis head F, and to the rear of said head with a foraminous plate C, the foramina $t$, of which are adapted to be engaged by the hook end of a brace bar R, two said brace bars being used for a purpose to be described hereinafter.

Secured near the opposite end are the studs 8 and 9, shown in Figs. 1 and 2, each of which gives pivotal support to two hinge-plates 15 and 16 and 15' and 16', respectively, these plates being shown in Fig. 2, and one set in detail in Fig. 3.

Hingedly secured to these hinge-plates 15, 15' and 16, 16', are the cultivator carrying bars 17 and 18, 19 and 20, these bars being arranged in sets of two in parallel spaced relation. At the outer ends as shown in Fig. 3, these bars are connected by means of a coupling rod 24', having an intermediate loop $z$, the ends of the rods 24', being secured to suitable eye bolts 3. The loops $z$, of the coupling rods 24', are adapted to receive the ends 2, of the notched supporting bars 25.

As shown in the drawings the forward cultivator bars 17 and 19, have the openings $s$, arranged to receive the loop end of the brace bars R, insuring these cultivator carrying bars being held in adjusted position relative to the carrying beam 10.

Each forward cultivator bar 17 and 19, is provided with a plurality of studs 5, which are arranged to pivotally receive the forward ends A, of the cultivator teeth $u$ and $v$, arranged in parallel spaced relation having the curve ends B.

As shown in Fig. 2, the bar 17, gives pivotal support to three such cultivator teeth $u$, while the bar 19, also gives pivotal support to three such cultivator teeth $v$, and that, positioned between the inner end teeth is a stationary tooth $x$, held in position by means of the studs 8 and 9, as shown in Fig. 2. This intermediately positioned cultivator tooth is removably held to the studs 8 and 9, and is arranged to give place at times to the fender D, having a drag bar E, which is arranged to be secured to the forward stud 8, as shown in dotted outline in Fig. 1.

Secured to the rear cultivator bars 18 and 110

20, are a plurality of pivot bolts 6, each bolt giving pivotal support to a movably held yoke plate 22, as shown in Fig. 3.

As disclosed each yoke is in the form of a plate having its ends bent at right angles as shown at 23, from which extends the supporting shoulders 24, the ends 23, being provided with the openings W, arranged to slidably receive the stems A, of the cultivator teeth. Each yoke is provided with an opening, to receive one of the pivot bolts 6.

Referring to the drawing it will be noticed that the yokes 22, hold the stems A, to the underface of the cultivator bars 18 and 20.

From the foregoing it will be understood that I provide a cultivator including an intermediately positioned stationary cultivator tooth and a plurality of adjacent parallel held cultivator teeth which can be adjusted backward and forward owing to the pivotal connection of hinge-plates and vertically owing to their hinge connection to the hinge-plates.

Forward or backward displacement is prevented by means of the brace bars R, while up and down or vertical displacement is prevented through the intermedium of the notched coupling rods 25, which have their notched ends pass through a suitable opening formed within a supporting standard comprising two members 31 and 33, which have their lower angular ends secured to the main carrying beam 10, by means of a suitable bolt 32.

The upper end of the bar 33, is secured to the bar 31, by means of the stud 2', the extreme upper end of the bar 33, being in the form of a spring detent m, this end being capable of being sprung out to permit the escape of the notched adjusting bar 30, having notches y, arranged to receive the stud 2', in adjusting this bar 30.

As shown in Fig. 4, the notches y, of the bars 25, are adapted to engage the members 31 and 33, and are removably held within the openings thereof, by means of a detent 35, sliding upon the pin 4, this detent having the finger piece or operating end 7, as clearly shown.

In drawing the members 25, backward and forward the cultivator supporting members are raised and lowered.

In order to balance the cultivator and regulate the depth the cultivator teeth enter the ground, I provide the forked frame 27, to the ends of which are secured the wheels 28, this forked frame being held upon a bolt 26, clearly shown in Fig. 7. To the upper stem 3', of this forked frame by means of a stud 29, is secured one end of the notched adjusting bar 30, having the handle p. In adjusting the handle 30, backward and forward the carrying beam 10, is raised and lowered.

As shown in the drawings the cultivator is provided with two guide handles 12, which have their lower ends secured by means of a bolt 11, to the main carrying beam 10, these handles 12, being braced by means of the supporting bars 13, and the brace bar 14.

The cultivator is simple and inexpensive in construction and both durable and efficient in operation, and the adjustment of the beam as well as the adjustment of the cultivator teeth may be effected with ease, accuracy, and despatch.

Having thus described my said invention what I claim as new and desire to secure by United States Letters Patent is:

The combination in a cultivator of the character described, of a main carrying beam, four hinge plates pivotally secured to said beam in sets of twos, a cultivator bar hingedly secured to each hinge plate, a coupling rod secured to said cultivator bars at their outer ends each coupling rod having an intermediate loop, a notched supporting bar secured to each of said loops, a supporting standard secured to said beam at a point between said hinge plates, said notch supporting bars being arranged to be adjustably engaged with said supporting standard whereby said cultivator bars may be raised and lowered, cultivator teeth secured to said cultivator bars, a foraminous plate secured to said beam, a brace rod extending from one set of said cultivator bars to said foraminous plate whereby said cultivator bars are held in adjusted position, a forked frame pivotally secured to said beam, two wheels secured to the lower end of said forked frame, a notched adjusting rod having its forward end secured to the upper end of said forked frame, a stud secured to said supporting standard arranged to engage within the notches of said last mentioned adjusting rod for tilting said forked frame backward and forward whereby said cultivator is balanced and the depths of the cultivator teeth are regulated.

In testimony whereof I affix my signature, in the presence of two witnesses.

WRIGHT W. CAIN.

Witnesses:
J. H. CAIN,
E. Y. FOSTER.